United States Patent [19]
Laue

[11] Patent Number: 5,456,137
[45] Date of Patent: Oct. 10, 1995

[54] PEDAL RODS AND A METHOD OF MAKING THE SAME

[75] Inventor: Charles E. Laue, 1041 Pawnee Rd., Wilmette, Ill. 60091

[73] Assignee: Charles E. Laue, Arlington Heights, Ill.

[21] Appl. No.: 237,319

[22] Filed: May 3, 1994

Related U.S. Application Data

[60] Continuation of Ser. No. 24,339, Mar. 1, 1993, abandoned, which is a division of Ser. No. 833,665, Feb. 11, 1992, Pat. No. 5,230,134.

[51] Int. Cl.⁶ .................................................... F16C 7/00
[52] U.S. Cl. ................................................... 74/579 R
[58] Field of Search ........................... 79/437, 510, 516, 79/517, 520, 428; 72/88, 89, 94, 377; 74/561, 562, 512, 560, 579.2, 580

[56] References Cited

U.S. PATENT DOCUMENTS

| | | | |
|---|---|---|---|
| 3,274,671 | 9/1966 | Hauer et al. | 29/157 |
| 3,623,442 | 11/1971 | Willis | 113/121 |
| 3,762,042 | 10/1973 | Abe et al. | 29/598 |
| 3,940,969 | 3/1976 | Princehouse | 72/377 X |
| 4,317,355 | 3/1982 | Hatsuno et al. | 72/342 |
| 4,391,162 | 7/1983 | Burke | 74/579 R |
| 4,399,682 | 8/1983 | Hackett | 72/359 |
| 4,700,446 | 10/1987 | Schmid et al. | 29/159.2 |
| 4,893,473 | 1/1990 | Hool et al. | 29/510 |
| 4,901,426 | 2/1990 | Laue | 29/510 |
| 4,967,584 | 11/1990 | Sato et al. | 72/356 |
| 4,970,887 | 11/1990 | Lorieux | 72/356 |

*Primary Examiner*—S. Thomas Hughes
*Assistant Examiner*—Kenneth J. Hansen

[57] ABSTRACT

A method for forming a shaft with protrusions applies vertical pressure to the shaft to deformably displace material from the shaft to form one or more protrusions. The protrusions are angularly spaced on and circumferentially aligned relative to the peripheral surface of the shaft. The shaft may be of any diameter, but typically a diameter of three-eighths of an inch, with the protrusions forming a larger diameter of typically one-half of an inch.

3 Claims, 2 Drawing Sheets

PEDAL RODS AND A METHOD OF MAKING THE SAME

This application is a continuation of application Ser. No. 08/024,339 filed Mar. 1, 1993, now abandoned, which is a divisional of application Ser. No. 07/833,665, filed Feb. 11, 1992 which issued as U.S. Pat. No. 5,230,134.

BACKGROUND OF THE INVENTION

1. Field of the Invention

The present invention relates to a method of forming a lug or stop protrusion or a seat on a shaft of substantially uniform diameter by a vertical pressing action. A specifically useful applicability is for use in making a pedal rod used in the automotive industry.

2. The Prior Art

A pedal rod is typically used with a vehicular pedal to respond to pressure applied by the foot of an operator, thereby to actuate a mechanical device. For example, when pressure is applied to a brake pedal, a valve body is urged into a vacuum chamber which in turn actuates a piston of a master cylinder containing liquid which actuates the pistons of wheel brakes.

The shaft of most pedal rods typically includes a ring-shaped stop for seating and/or retaining a spring. The stop is located along the shaft at a fixed and predetermined location. The shaft of the pedal rod can be various diameters, but typically a one-half inch diameter or three-eighths inch diameter rod is used.

To form a stop on such prior art pedal rods, if a one-half inch diameter rod is used, a cold header operation may be required to produce a ring by using horizontal pressure to form the ring.

In other forms of prior art, a groove is cut in the surface of the rod in order to receive and seat a snap ring.

In addition, a slow chucking operation is required before entering the forging process, if any kind of machining is contemplated. Such operations are both costly and time consuming. The cost of materials, in addition, is significantly greater since one-half inch diameter rods are usually required to be used to implement the prior art forming methods.

Most pedal rods have a ball component of a ball joint on one end which must be formed by machining to achieve the required precision sizing. Unless the diameter of the ball joint permits, any attempt to introduce a stop forming action in an axial direction past the ball joint will fail.

The prior art is exemplified by my prior U.S. Pat. No. 4,901,426.

SUMMARY OF THE INVENTION

The present invention eliminates the costly material requirement of the prior art method for forming pedal rods by applying vertical pressure to an area of the rod where the stop is to be located. This vertical protrusion method, in effect, thrusts the material of the rod radially outwardly such that two protrusions or ears (or more, if necessary) are formed, therefore, rather than forming an entire circumferentially complete ring to act as a retainer spring, individual circumferentially spaced radially outwardly projecting protrusions from the shaft itself are used as a stop for the spring.

The material savings are significant since the method begins with a three-eighths inch diameter shaft and applies a vertical force sufficient to displace the ductile material of the rod and to thereby form the protrusion wherein a projecting lug forms a stop. The diametrical dimension of the stop can exceed that of the original rod in the proportion of the diameter of a rod of three-eighths inch having a one-half diameter stop. If a larger diameter stop is required for a particular application, it can be achieved without detriment to the compression and tensile requirements for the rod.

BRIEF DESCRIPTION OF THE DRAWINGS

The features of the present invention are set forth with particularity in the appended claims. The invention, together with further objects and advantages, may best be understood by reference to the following description taken in conjunction with the accompanying drawings, and the several figures in which like reference numerals identify like elements, and in which:

DETAILED DESCRIPTION OF THE PREFERRED EMBODIMENTS

Figure 1:
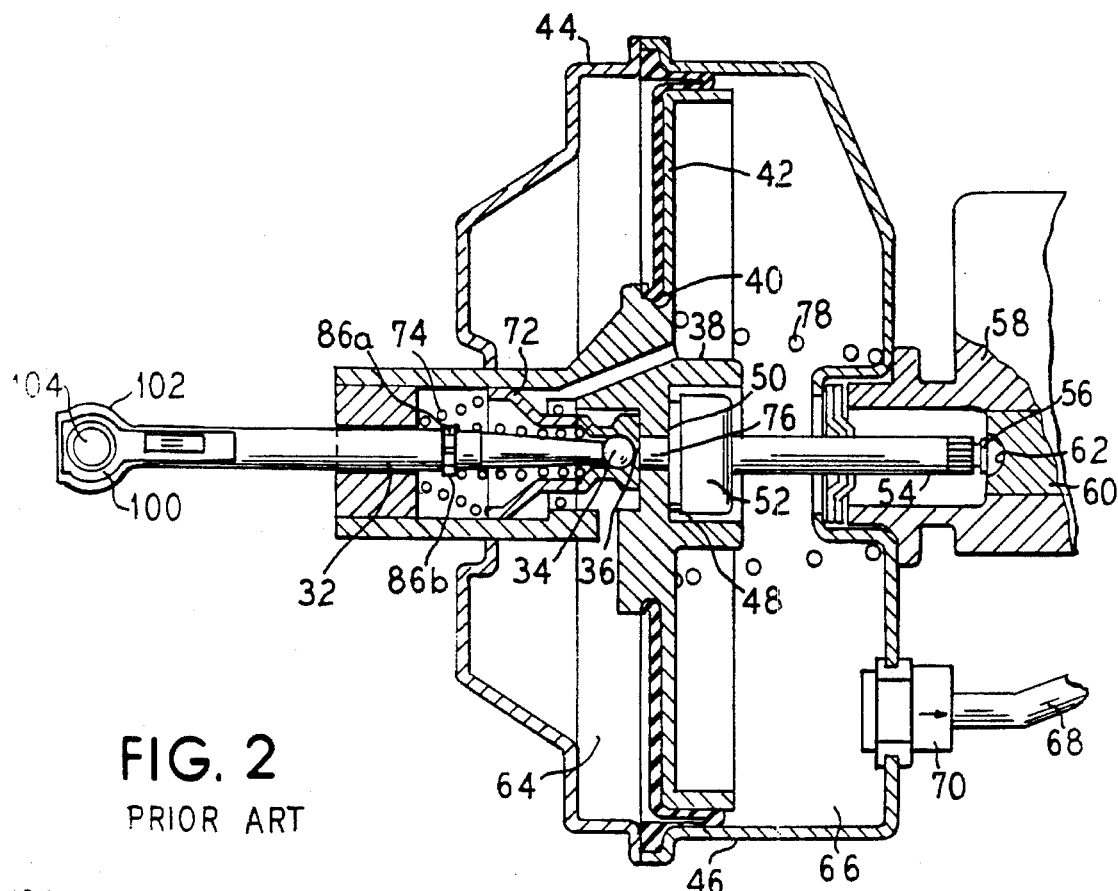
FIG. 1 is a schematic axial sectional view, partly in elevation, of a power brake unit comprising an embodiment of a pedal rod embodying the principles of the present invention.
Figure 2:
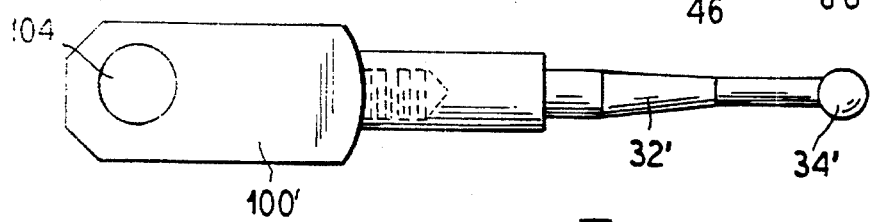
FIG. 2 is a side elevational view of a prior art pedal rod.

Referring first to FIG. 1, the specific environment of an exemplary automotive power brake unit is shown as disclosed in my prior U.S. Pat. No. 4,901,426. It should be understood the invention is not limited to such an environment. The actual pedal rod used is generally designated at 30 and has a shaft piece 32. A ball is adapted to be received in a complementary cylindrical recess or socket 36 to form a ball joint 34 with an annular valve body 38 which has an annular recess or groove 40 having an air-tight snap fit with the inner diameter of an annular resilient diaphragm 42, the outer diameter of which is clamped by a pair of annular shell or housing members 44 and 46. The ball joint 34 is preferably precision formed as by a machining operation. Once formed, it will be recognized that the diameter of the ball restricts any further forming actions which may be contemplated in an axial direction.

The valve body 38 has a seat 48 for a rubber pad 50 engaged by a large end 52 of a compression rod assembly 54 which has a smaller plunger end 56 received within a conventional master brake cylinder 58 removably attached to the shells 46. The plunger end 56 of the compression rod assembly tightly engages the master cylinder piston 60 at a point 62 for actuation thereof as hereinafter described.

The diaphragm 42 defines spaced vacuum chambers 64 and 66 within the shells 44 and 46, respectively, both of said chambers being connected in the usual manner to intake manifold (not shown) of the vehicle's internal combustion engine through a hose 68 and check valve 70.

When pressure is applied by the operator to the brake pedal, the pedal rod 30 is urged into a conventional valve 72 against resistance of a compression release spring 74 reacting against the valve body 38. A stop 86a and 86b, formed by the method of the present invention, acts as a retainer for the compression release spring 74. The movement of pedal rod 30 causes conventional valve 72 to cut-off communication between chambers 64 and 66 and to admit atmospheric pressure to chamber 64 causing the valve body 38 and diaphragm 42 to exert that pressure against the compression rod assembly 54 which, in turn, actuates the piston 60 of the master cylinder 58.

When the engine (not shown) of the automotive vehicle (not shown) is running, air is drawn through a hose 68 and check valve 70. This creates a vacuum in both chambers 64 and 66. When pedal rod 30 urged into chamber 64 by depression of a brake pedal (not shown), chamber 66 remains under vacuum, but atmospheric pressure is admitted to chamber 64 by valve 72, thus exerting atmospheric pressure against the diaphragm 42 which moves into chamber 66 along with valve body 38. Inasmuch as atmospheric pressure is of the order of fourteen pounds per square inch at sea level, with a ten inch diameter diaphragm 42, the braking pressure amounts approximately in the order of 1,000 pounds per square inch by the application of 10–18 pounds of force to the brake pedal by the operator.

As this actuation occurs, the rubber of disk 50 flows into a hole 76 of a wall of the valve body 38 at the inner end of its socket 36. This is very important in that the braking force is caused to be proportionate to the pressure of the operator's foot on the brake pedal, thus giving the operator a sense of "feel" that would be lacking if such flowing of the rubber of the disk 50 did not occur.

Upon release of the pedal rod 30, the valve 72 closes which cuts off atmospheric pressure from chamber 64 and reconnecting it to chamber 66 so that chamber 64 is again under vacuum, whereupon the resiliency of the diaphragm 42 and a return spring 78 and chamber 66 returns the parts to a no-brake position as shown in FIG. 1.

Figure 3:
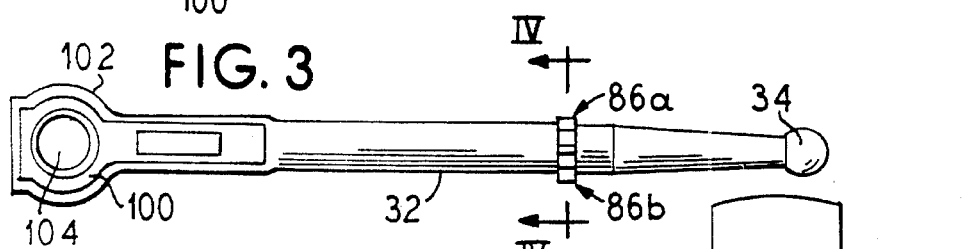
FIG. 3 is a side elevational view of a pedal rod of the present invention.
Figure 4:
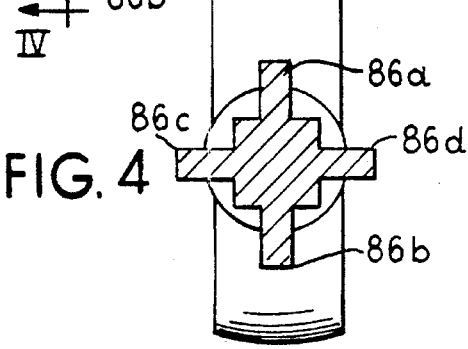
FIG. 4 is an enlarged cross-sectional view taken along line IV—IV of FIG. 3.

The pedal rod shown in FIGS. 3 and 4 has an end-piece 100 formed of a free machining material, such as punch-press steel, stamped into the form of a flat portion 102 with an aperture or eye 104 therethrough adapted for connection to an associated brake pedal (not shown). The end piece 100 is connected to the shaft 32 using the method described in U.S. Pat. No. 4,901,426, the disclosure of which is herein incorporated by reference.

The end piece 100 can be a straight or flat type as shown by the flat portion 102 in FIG. 3 or a clevis type. The end piece 100 using the clevis type is shown in my U.S. Pat. No. 07/712,554 now U.S. Pat. No. 5,228,818, filed Jun. 10, 1991, the disclosure of which is herein incorporated by reference.

In accordance with the present invention, a novel stop and method of making the stop is employed which affords vast manufacturing advantages in terms of cost, material, time and trouble.

First of all, it is contemplated that the forming of the pedal rod will commence with the selection of appropriate elongated cylindrical rod stock. The selection should afford the provision of a suitably ductile material that can be deformably displaced under achievable press pressure applied by presses used in mass production techniques.

The rod stock is a straight cylindrical member disposed on a longitudinal axis.

The shaft 32 is typically of a substantially uniform diameter of three-eighths inch, although it will be recognized that a different sized diameter rod can be used, without departing from the principles of the present invention.

Figure 5:
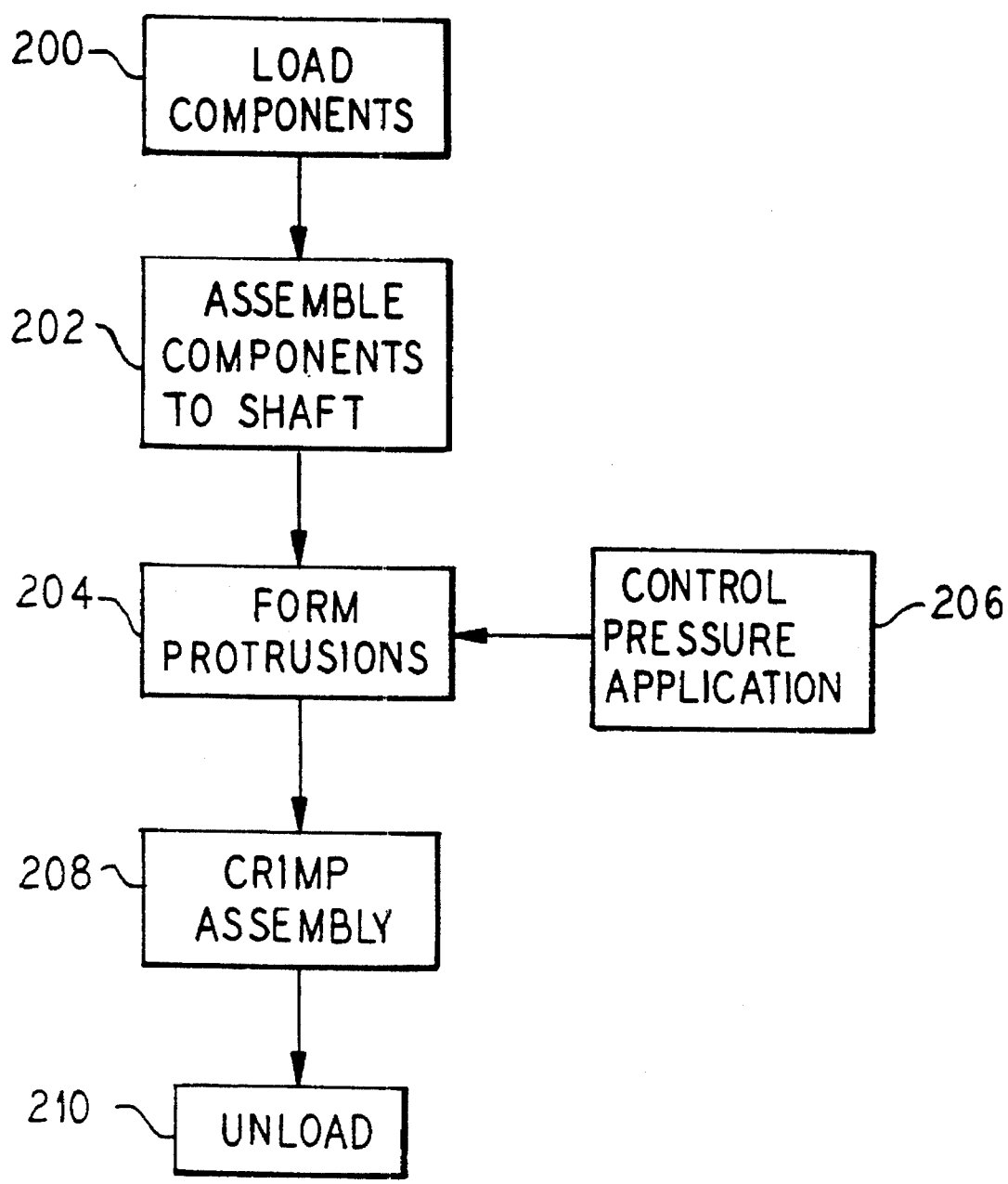
FIG. 5 is a flow chart diagraming the steps of a method of forming a pedal rod in accordance with this invention.

FIG. 5 illustrates the further steps of my method for forming the pedal rod of the present invention. At steps 200 and 202, the shaft 32 and end piece 100 are loaded and assembled as is shown in U.S. Pat. No. 4,901,426.

In order to form a stop along the length of the shaft 32, vertical pressure is applied at a predetermined selected longitudinal position on the shaft 32 where the stop is to be formed. Since a deformably ductile material is used for the shaft 32, a carefully controlled pressure can be applied vertically to the shaft 32 to physically displace the ductile material of the shaft body to form an outwardly extending stop 86 projecting radially outwardly on the shaft 32 beyond the confines of its normal diametrical dimension.

Plural vertical protrusions 86a and 86b are formed to extend radially outward from the peripheral surface of the shaft. For a three-eighths inch diameter shaft, vertical protrusions 86a and 86b are formed to extend at a diameter of approximately one-half inch. This is more clearly shown in FIG. 3 where four ears or protrusions 86a, 86b, 86c and 86d have been formed outwardly extending from the periphery of the shaft to form a diameter of one-half inch, that is one-sixteenth of an inch extending beyond the periphery of the shaft diametrically opposed to each other.

FIG. 4 shows four protrusions or ears spaced equidistantly about the periphery of the shaft, that is at 90° with respect to each other. The protrusions 86a, 86b, 86c, and 86d, therefore, form a stop against which the retainer spring 74 reacts.

The quantum of pressure is controlled at 206 based on the properties of the material used for the shaft 32. Therefore, the material itself is actually forced below the diameter of the shaft 32 to force material from the shaft 32 outwardly to form a protrusion, such as 86a, 86, 86c and/or 86d. The shaft 32 is subjected to pressure such that a one-sixteenth inch protrusion is formed on diametrically opposite sides resulting in a total of one-half inch total diameter from the tip of protrusion 86a to the tip of protrusion 86b. If a larger diameter is desired, this can be achieved by the application of additional pressure. Or, four spaced protrusions 86a, 86b, 86c, and 86d angularly spaced from each other, i.e., at 90°, may be formed. If different spacing of the protrusions is desired for a particular application, this, as well, may be controlled by the application of pressure at particular points selected along the shaft 32 of the pedal rod.

The shaft 32 is then crimped as shown in U.S. Pat. No. 4,901,426 to prevent accidental unthreading between the shaft 32 and the end piece 100. Finally, the completed pedal rod with its protruded section formed by the vertical protrusion method may be unloaded at 210.

Although various modifications and changes may be suggested by those skilled in the art, it should be understood that I wish to embody within the scope of the patent warranted hereon all such modifications and changes as come within the scope of the following claims.

What is claimed is:

1. A pedal rod for use in a brake system for attaching to a clevis at one end of said rod, said rod comprising:

a linear shaft of uniform diameter in a mid-section of the shaft, the shaft having a first end having an aperture, the aperture being a part of an end piece having a dimension greater than the uniform diameter, and a second end having a solid ball joint having a diameter less than the uniform diameter wherein a tapering section connects the mid-section and the ball joint; and at least two lug-shaped stops extending radially outward beyond said uniform diameter of said shaft at a longitudinal distance intermediate ends of the mid-section, said at least two lug-shaped stops having a second diameter larger than said uniform diameter of the mid-section.

2. A pedal rod for use in a brake system comprising:

a generally cylindrical, axially-extending, rod-shaped member having a uniform diameter in a mid-section of the rod-shaped member and having a linear body made of ductile material, the member having a first end having an aperture, the aperture being part of an end piece having a dimension greater than the uniform diameter and a second end having a solid ball joint having a diameter wherein a tapering section connects the mid-section and the ball joint; and a plurality of lug-shaped stops deformably displaced out of the body of said member at a longitudinal distance between ends of the mid-section at predetermined angular displacements and designed to project radially outwardly of a peripheral surface of said member, the plurality of lug-shaped stops having a radius greater than one-half of the diameter of the ball joint.

3. The rod of claim 2 wherein the end piece is threadably connectable with said member.

* * * * *